W. J. WIGMAN.
AUTOMOBILE SIGNAL.
APPLICATION FILED SEPT. 26, 1919.
1,327,128.
Patented Jan. 6, 1920.
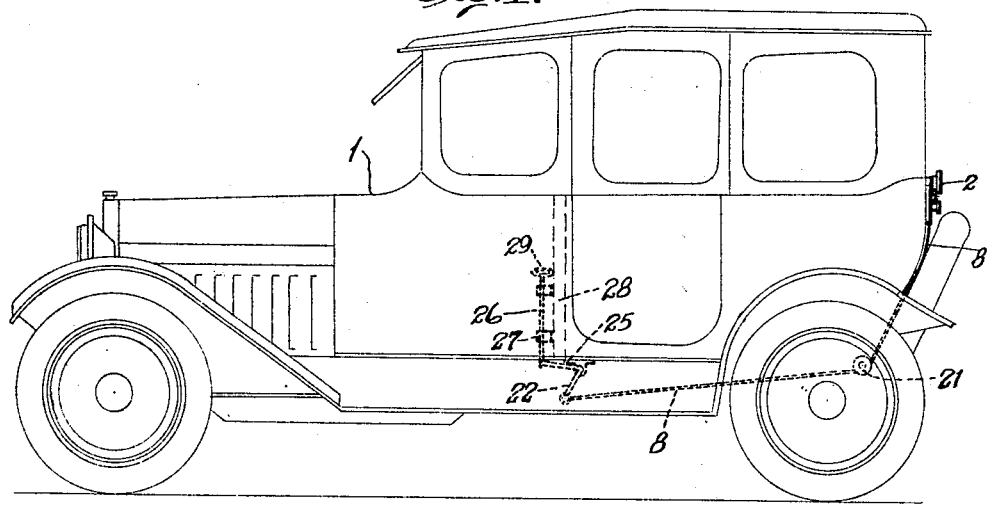
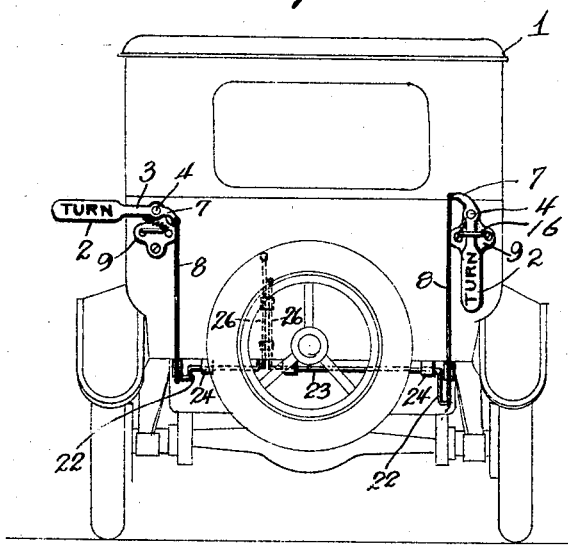
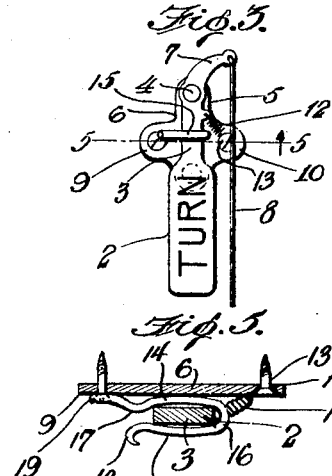
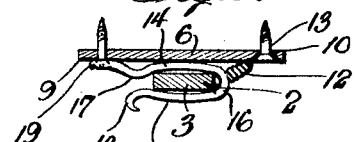
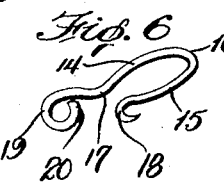
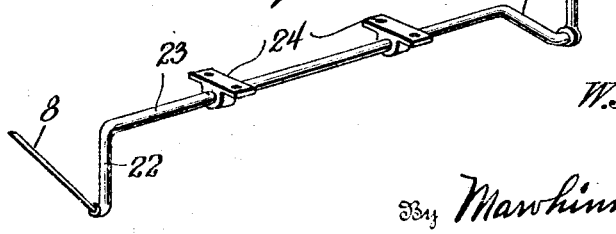
Inventor
W. J. Wigman
By Mawhinney & Mawhinney
Attorneys

UNITED STATES PATENT OFFICE.

WILLIAM J. WIGMAN, OF MANITOWOC, WISCONSIN.

AUTOMOBILE-SIGNAL.

1,327,128.   Specification of Letters Patent.   Patented Jan. 6, 1920.

Application filed September 26, 1919. Serial No. 326,616.

*To all whom it may concern:*

Be it known that I, WILLIAM J. WIGMAN, a citizen of the United States, residing at Manitowoc, in the county of Manitowoc and State of Wisconsin, have invented new and useful Improvements in Automobile-Signals, of which the following is a specification.

The present invention relates to improvements in automobile signals, and more particularly relates to an improved traffic signal adapted to be carried by automobiles and other vehicles to take the place of the present dangerous practice of thrusting the arm beyond the side of the vehicle to indicate to drivers of following vehicles a proposed stop or change in direction.

It is an object of the present invention to provide a signal of the above character which is capable of application to all present types of automobiles without any modification of the structures thereof, and which will be comparatively inexpensive and easy to install.

A further object of the present invention resides in providing improved means for operating the signal and in the provision of a device which will prevent the signal from rattling or from becoming displaced from the inoperative non-indicating position due to the jarring of the vehicle.

With the foregoing and other objects in view, the invention will be more fully described in connection with the accompanying drawings, wherein like symbols refer to like or corresponding parts throughout the several views, and in which:

Figure 1 is a side elevational view of an automobile shown equipped with an improved signal constructed in accordance with the present invention.

Fig. 2 is a rear view of the same.

Fig. 3 is a perspective view of the improved signal illustrated in the indicating position.

Fig. 4 is a perspective view of the operating means, and

Fig. 5 is a similar view of the spring holder.

Fig. 6 is a perspective view of a spring holder.

Referring more particularly to the drawings, in which only a single embodiment of the invention is illustrated, 1 designates an automobile shown in Figs. 1 and 2 as having the improved signal installed thereon.

The signal consists of an arm or semaphore 2 having an enlarged flattened blade adapted to project beyond the side line of the vehicle body when raised to an indicating position and preferably bearing some such word as "Turn" thereon. Beyond the blade the signal arm is reduced to provide a shank 3 pivoted as indicated at 4 on the forward side of a perforated lug 5, which is carried by and offset rearwardly from a bracket 6.

The shank 3 is extended to the opposite side of the pivot 4 and is formed into a curved tail-piece 7 to which one end of a flexible connection 8, such as a cord or rope, is attached. The bracket 6 is formed with a pair of lateral perforated arms 9 and 10 and a lower perforated arm 11. Bolts or other fastening means may be passed through the perforations in the arms 9, 10 and 11 to secure the bracket 6 to a vehicle. The bracket 6 is preferably attached to the rear end of the vehicle body close to the side thereof and substantially in the position shown in Figs. 1 and 2.

A coil spring 12 is connected at one end to the shank 3 of the signal arm and at its other end to the fastening 13 that passes through the perforation in the bracket arm 10. The coil spring 12 acts to yieldingly draw the signal arm down to the position shown at the right in Fig. 2, but readily yields when the signal arm is raised by the connection 8 to the position shown at the left in the same figure.

When in the lowered position the shank 3 of the signal arm is received in the jaws 14 and 15 of a spring holder 16 which is preferably made from a single length of wire bent into approximately U-shape and having its free ends 17 and 18 flared apart to guide the shank 3 within the spring jaws 14 and 15 and to allow the jaws to be made contracted and to be pried apart by the shank 3 when entering the same whereby the shank will be tightly gripped by the jaws and held from rattling and from accidental displacement from the lowered non-indicating position. The fastening 19 passing through the perforation in the bracket arm 9 is utilized to support the spring holder 16, one end 20 thereof being looped about such fastening 19 and being firmly held by the head of this fastening against the face of the bracket arm 9.

The flexible connection 8 passes down beneath the body of the vehicle and forwardly, being carried about one or more rollers 21. At its forward end the connection 8 is coupled to the lower end of a crank arm 22 bent down from a shaft 23 transversely journaled in brackets 24 carried by the vehicle approximately beneath the front seat thereof. The rock shaft 23 is also provided with a second crank arm 25 bent from the opposite end thereof forwardly from the shaft and being connected to the lower end of a vertically reciprocating operating rod 26 guided by one or more brackets 27 which are secured to the riser 28 of the front seat of the vehicle. A handhold 29 is carried at the upper end of the operating rod 26 and is convenient to the hand of the occupant of the driver's seat for lifting said rod.

In operation, whenever the driver proposes to stop or make a turn, he will grasp the handhold 29 and lift the operating rod 26, which will cause the shaft 23 to be rocked pulling forwardly on the connection 8. The connection 8 will draw the tail-piece 7 down swinging the signal arm about the pivot 4 and projecting the blade thereof out beyond the side of the vehicle as shown at the left in Fig. 2 where it will form a signal readily seen by drivers of following vehicles.

As soon as the rod 26 is released the coil spring 12 will draw the signal arm back to the non-indicating position and within the jaws 14 and 15 of the spring holder. The effect of the coil spring 12 will also be transmitted through the connection 8 to restore the rock shaft 23 and operating rod to the initial position.

The spring holder is important as it binds the signal arm against rattling or against becoming accidentally displaced and confusing signals.

While I have described only a single signal arm, it is obvious that two arms may be placed on the vehicle as shown in Fig. 2, one near each side thereof and having two operating rods located close together so that the driver may select either accordingly as he proposes to make either a right or left turn.

It is of course understood that various changes and modifications may be made in the above specifically described embodiment of this invention without departing from the spirit thereof, such changes and modifications being restricted only by the scope of the claims which follow.

What is claimed is:

1. In combination with a vehicle, a signal therefor, means whereby said signal may be pivotally supported on the vehicle, a flexible connection coupled to said signal for moving the same to the indicating position, a rock-shaft journaled on the vehicle and having an arm connected to said flexible connection, means for oscillating said rock-shaft, a spring clip mounted on the signal supporting means and consisting of a single length of wire being substantially U-shaped and providing a pair of spring jaws flared apart at their opened ends to guide the signal between said jaws, and yieldable means for drawing the signal between the jaws when the rock-shaft is released.

2. In combination with a vehicle, a bracket secured on the vehicle and having an upwardly and two laterally projecting perforated arms, fastening means passing through said perforated arms, a signal pivoted on the fastening means passing through the upwardly projecting arm, a spring clip held by the fastening means passing through one of the lateral arms, said spring clip adapted to receive the signal when in the inoperative position, a coil spring being connected at one end to the signal and at its other end being secured to the fastening passing through the other lateral arm, and means for swinging said signal out of said spring clip and in opposition to the influence of said coil spring whereby the signal may be displayed in the indicating position.

3. In combination with a vehicle, a bracket secured on the vehicle and having an upward and two laterally projecting perforated arms, fastening means passing through said perforated arms, a signal pivoted on the fastening means passing through the upwardly projecting arm, a spring clip held by the fastening means passing through one of the lateral arms, said spring clip adapted to receive the signal when in the inoperative position, a coil spring for drawing the signal arm into the clip, said coil spring being connected at one end to the signal arm and at its other end being secured to the fastening passing through the other lateral arm, a tail piece on the signal arm, a flexible connection coupled to said tail piece, a rock-shaft having a crank connected to the other end of said flexible connection, a second crank arm on said rock-shaft, an operating rod connecting to said second crank arm, and guides for the operating rod.

WILLIAM J. WIGMAN.